R. C. MURDOCK.
REIN HOLDER.
APPLICATION FILED FEB. 26, 1910.

963,622.

Patented July 5, 1910.

Witnesses
E. Larson
Charles A. Wilson

Inventor
R. C. Murdock,
By Beller & Roble
Attorneys

UNITED STATES PATENT OFFICE.

REMUS C. MURDOCK, OF OXFORD, NEBRASKA.

REIN-HOLDER.

963,622.   Specification of Letters Patent.   Patented July 5, 1910.

Application filed February 26, 1910. Serial No. 546,159.

*To all whom it may concern:*

Be it known that I, REMUS C. MURDOCK, a citizen of the United States, residing at Oxford, in the county of Furnas and State of Nebraska, have invented certain new and useful Improvements in Rein-Holders, of which the following is a specification.

This invention has reference to rein holders, and is designed particularly to construct a device of this nature wherein the locking clutch is held open when the same is not in use, consequently eliminating one operation when it is necessary to secure the reins therein.

Figure 1:
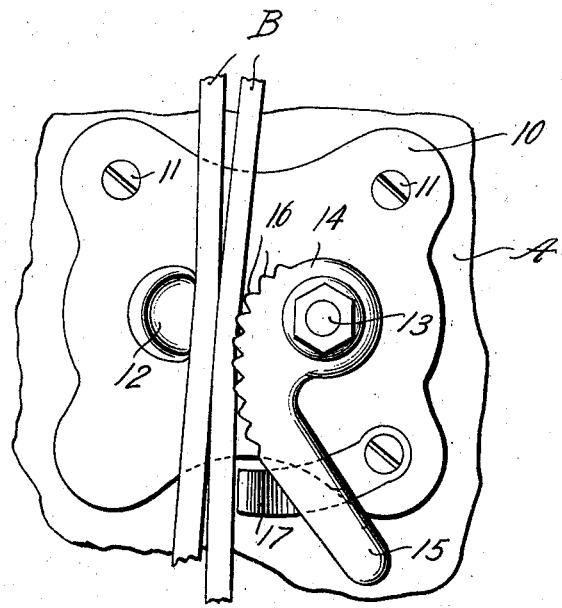
Figure 2:
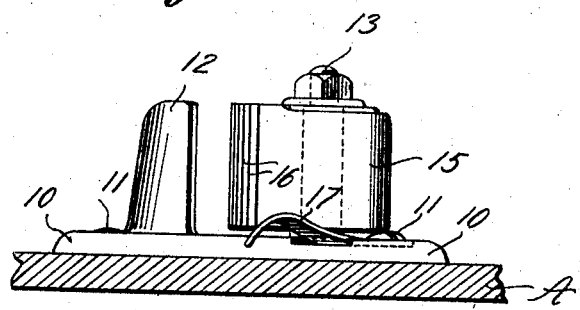

With the above and other objects in view, this invention consists of the construction, combination and arrangement of parts all as hereinafter more fully described, claimed and illustrated in the accompanying drawings, wherein:

Figure 1 is a top plan view of a device constructed in accordance with the present invention; Fig. 2 is a side elevation thereof.

The invention forming the subject-matter of the present application comprises a base plate 10 having a plurality of screws 11 piercing the corners thereof and adapted to engage the wagon body or the like, A.

In order to provide a bearing surface for the reins there is centrally formed on the plate 10 the projection or lug 12, said projection or lug being flattened on its inner vertical side.

Oppositely disposed to the lug 12 and pivotally mounted on the pin 13 is the clutch block 14, said clutch block being provided with the handle 15 and the serrations or teeth 16 adjacent the lug 12. This clutch block is of cam formation and is adapted to engage the reins indicated in general as B between the teeth 16 of said clutch block and the flattened surface of the lug 12.

In order to provide a means whereby the clutch block may be retained open in such a manner that the reins may be placed between the same and the lug 12, a spring 17 is secured in a depression in the base plate under one of the screws 11 and projects therefrom toward the lug 15, but to one side of the base plate 10. This spring curves upwardly adjacent to its outer extremity and bears against one of the edges of the handle 15 of the clutch block, retaining the same open while the reins are being placed in position.

Having thus fully described my invention, what I claim as new is:

An article of the class described, comprising in combination, a base plate having a plurality of screw holes formed therein and a depression adjacent one of said screw holes, a plurality of screws adapted to attach said base plate, a lug formed centrally on said base plate having one side thereof flattened, a pin likewise formed on said base plate oppositely disposed to the flattened surface of said lug, a cam clutch block pivotally and removably carried by said pin, provided with a series of serrations adjacent to said lug, and a spring carried by said base plate in the depression thereof, by one of the attaching screws, said spring curving upwardly at its outer extremity and adapted to engage the handle of the clutch block and retain the same from coöperation with the lug when inoperative.

In testimony whereof I affix my signature in presence of two witnesses.

REMUS C. MURDOCK.

Witnesses:
J. H. SHERWOOD, Jr.,
E. E. LEE.